No. 893,964.  
PATENTED JULY 21, 1908.  
J. R. WHITTEMORE.  
LUBRICATING FILTER FOR ENGINES.  
APPLICATION FILED APR. 1, 1907.

WITNESSES:  
W. M. Gentle  
N. Allemong

INVENTOR.  
John R. Whittemore  
BY  
V. H. Lockwood  
ATTORNEY.

UNITED STATES PATENT OFFICE.

JOHN R. WHITTEMORE, OF INDIANAPOLIS, INDIANA.

LUBRICATING-FILTER FOR ENGINES.

No. 893,964.    Specification of Letters Patent.    Patented July 21, 1908.

Application filed April 1, 1907. Serial No. 365,900.

*To all whom it may concern:*

Be it known that I, JOHN R. WHITTEMORE, of Indianapolis, county of Marion, and State of Indiana, have invented a certain new and useful Lubricating-Filter for Engines; and I do hereby declare that the following is a full, clear, and exact description thereof, reference being had to the accompanying drawings, in which like letters refer to like parts.

The object of this invention is to provide a simple and effective filter for the lubricating oil in the crank chamber of an engine wherein the lubricating oil is splashed by the crank so as to lubricate the various parts of the mechanism against and about which the oil is thrown.

Figure 1:
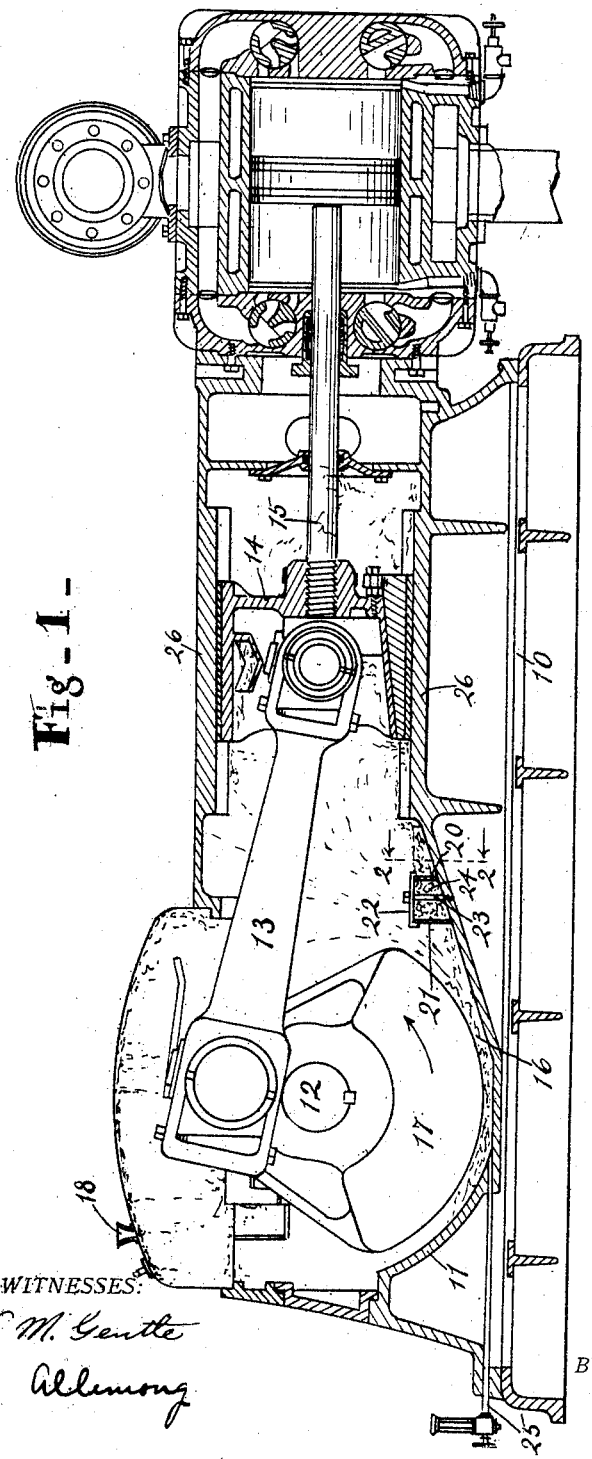
Figure 2:
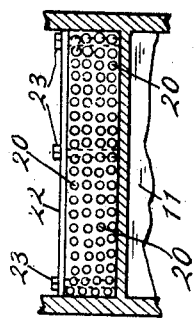

The nature of the invention will be understood from the accompanying drawings and the following description and claims:

In the drawings Figure 1 is a central vertical longitudinal section of the engine. Fig. 2 is a transverse section of a part thereof on the line 2—2 of Fig. 1.

In detail upon a suitable base 10 a casing 11 is mounted forming a chamber in which the crank shaft 12 is transversely mounted. This shaft is actuated by a connecting rod 13 which is pivoted to the crosshead 14 that is reciprocated by the piston rod 15. Beneath the crank shaft 12 the bottom of the casing 11 is depressed to form an oil receptacle for the lubricating oil 16. On the shaft 12 a fan tail crank 17 is secured, which at each revolution dashes the oil in the bottom of the casing 11 and throws it upon the crosshead 14, its bearings and all of the associated parts. This crank shaft chamber is inclosed so that the lubricating oil cannot escape, and therefore as is well known to engineers a very economical use of the oil is attained and its distribution is very satisfactory. Oil is introduced into said chamber through the opening 18.

The bottom of the casing or chamber slopes downward rearwardly from the crank end of the guides 26 to the lower part of said chamber under the crank shaft 17. The oil flowing out of the crank end of the guide section 26 runs down this slope.

My invention consists in placing transversely across the path of the returning lubricating oil a filter whereby the lubricating oil will be purified and separated from the dirt or grit of any nature. This filter consists of two vertical perforated plates 20 and 21, and a cap plate 22 held upon said perforated plates by bolts 23 that extend through said cap and screw into the bottom of the casing 11. These three plates, with the bottom of the casing form a chamber that contains packing 24 of some filtering material. As the lubricating oil returns down the sloping bottom of the casing 11 it must pass through this filter and as it does so, the filtering material will cleanse it. A valve controlled drain pipe 25 leads from the steam bottom of the casing 11 for entirely draining the lubricating oil whenever this is desired.

What I claim as my invention and desire to secure by Letters Patent is:

The combination with a machine having an inclined bottom, and means for applying lubricating oil to said machine so that it will flow from the parts of the machinery lubricated down said inclined bottom, of a filter extending across the path of the lubricating oil, substantially as set forth.

In witness whereof, I have hereunto affixed my signature in the presence of the witnesses herein named.

JOHN R. WHITTEMORE.

Witnesses:
 OLIVE BREEDEN,
 WILLIAM M. GENTLE.